United States Patent [19]

Hiraoka et al.

[11] Patent Number: 4,686,944
[45] Date of Patent: Aug. 18, 1987

[54] INTAKE MANIFOLD STRUCTURE FOR V-TYPE ENGINE

[75] Inventors: Tetsuo Hiraoka; Koichi Hatamura; Sigeyasu Yamamoto, all of Hiroshima, Japan

[73] Assignee: Mazda Motor Corporation, Japan

[21] Appl. No.: 853,755

[22] Filed: Apr. 18, 1986

[30] Foreign Application Priority Data

Apr. 22, 1985 [JP] Japan .................. 60-60515[U]

[51] Int. Cl.⁴ .............................................. F02B 75/18
[52] U.S. Cl. .................... 123/52 MV; 123/52 MC
[58] Field of Search ........ 123/52 M, 52 ML, 52 MV, 123/52 MB, 52 MC

[56] References Cited

U.S. PATENT DOCUMENTS

| | | | |
|---|---|---|---|
| 2,771,863 | 11/1956 | Porsche et al. | 123/52 MV |
| 2,916,027 | 12/1959 | Chayne et al. | 123/52 MV |
| 2,927,564 | 3/1960 | Turlay et al. | 123/52 MV |
| 4,463,711 | 8/1984 | Yoshioka | 123/52 MV |
| 4,615,324 | 10/1986 | Choushi et al. | 123/52 MV |

FOREIGN PATENT DOCUMENTS 59-115460  7/1984  Japan .

Primary Examiner—Charles J. Myhre
Assistant Examiner—David A. Okonsky
Attorney, Agent, or Firm—Gerald J. Ferguson, Jr.; Michael P. Hoffman; Ronni S. Malamud

[57] ABSTRACT

In an intake system for a V-type engine having a plurality of cylinders in each of first and second cylinder banks, a plurality of intake ports each of which is communicated with one of the cylinders being open in the inner surfaces of the cylinder banks opposed to each other, an intake manifold structure for forming discrete intake passages which are separately communicated with the respective intake ports to introduce intake air into the cylinders corresponding thereto comprises first and second pieces. The first piece is provided with a plurality of passages each forming one of said discrete intake passages communicated with the intake ports of the first cylinder bank and a connecting portion for integrally connecting the passages at a portion near the first cylinder bank. The second piece is provided with a plurality of passages each forming one of said discrete intake passages communicated with the intake ports of the second cylinder bank and a connecting portion for integrally connecting the passages at a portion near the second cylinder bank. The first and second pieces are fastened together so that the passages of the first and second pieces are alternately positioned in the direction of the row of the cylinders and cross each other between the first and second cylinder banks.

9 Claims, 5 Drawing Figures

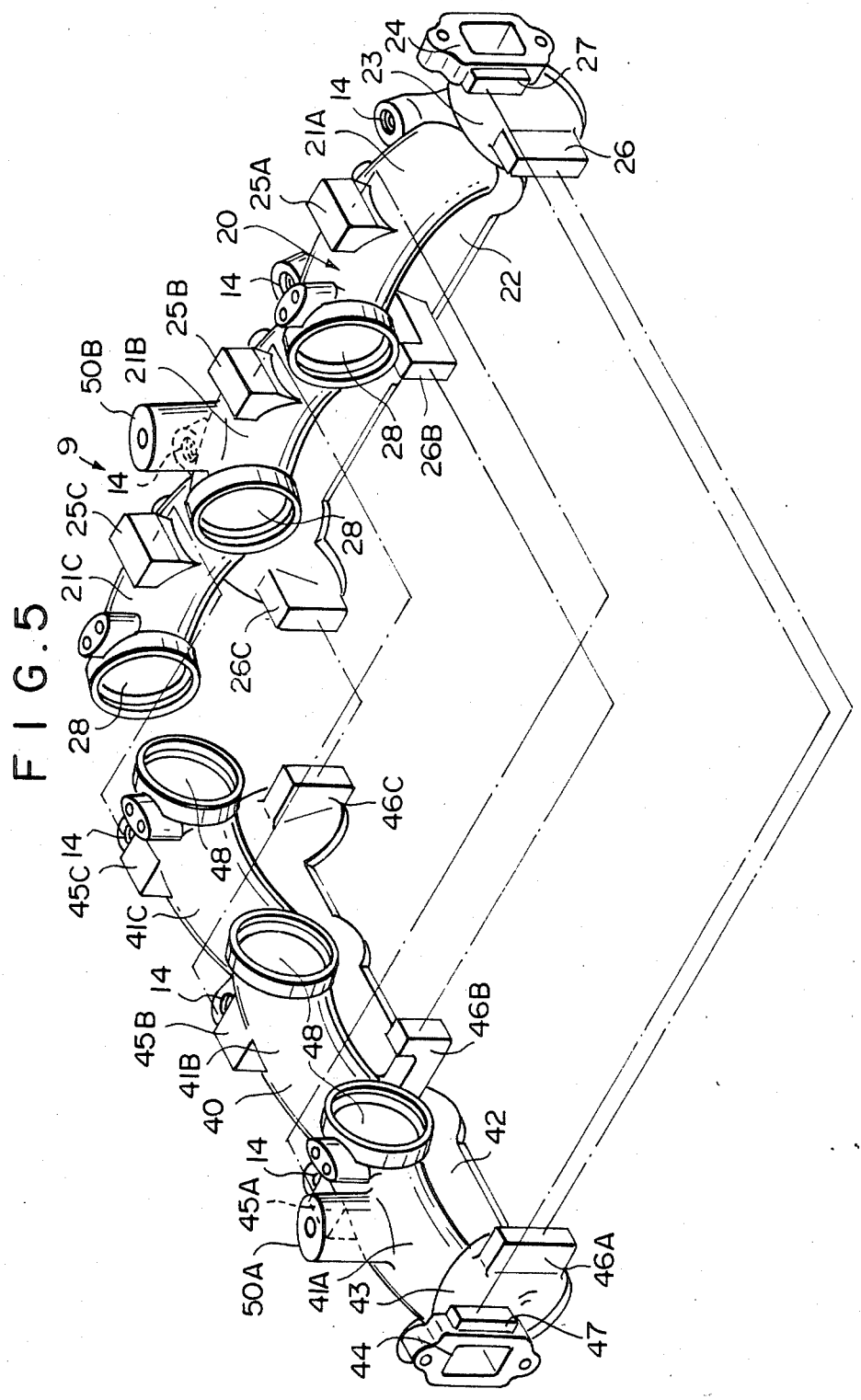

INTAKE MANIFOLD STRUCTURE FOR V-TYPE ENGINE

BACKGROUND OF THE INVENTION

1. Field of the Invention

This invention relates to an intake manifold structure for a V-type engine.

2. Description of the Prior Art

Recently there have been made various attempts to effectively utilize the inertia effect of engine intake air in order to improve the volumetric efficiency, thereby improving the output power of an engine. The inertia effect of intake air is enhanced with the reduction in the flow resistance in the intake passage and the increase in the length of the intake passage. Accordingly, in order to sufficiently improve the volumetric efficiency by the inertia effect of intake air, it is required that the intake manifold is as straight and long as possible.

In the case of an in-line engine, a relatively large space remains in the engine compartment at the opposite sides of the engine, and accordingly, an intake manifold which can satisfy such a requirement can be easily mounted. On the other hand, in the case of a V-type engine, a pair of cylinder banks are disposed in the engine compartment spaced transversely from each other, and accordingly, the space on the opposite sides of the engine is relatively small and is not sufficient to accommodate an intake manifold which can satisfy the requirement described above.

Therefore, in the V-type engine, the intake manifolds for the right and left cylinder banks are arranged to cross each other and are disposed above the space between the cylinder banks in order to satisfy the requirement described above as disclosed, for instance, in Japanese Unexamined Patent Publication No. 59(1984)-115460.

It is preferred that the intake manifolds for the right and left cylinder banks be integrally formed in order to facilitate incorporation of the intake manifolds in the engine. Therefore, conventionally, the intake manifolds are generally formed in one piece by cast molding.

However, in the case that the integral intake manifolds are molded by molds having no core, many undercut portions are required in the molds since the parting line of the molds is complex, and accordingly the number of post-processing steps is increased, canceling out the advantage of cast molding. On the other hand, when the integral intake manifolds are molded by molds having cores for forming the undercut portions, the molding operation itself is complicated, making mass production thereof difficult, thereby adding to the manufacturing cost.

SUMMARY OF THE INVENTION

In view of the foregoing observations and description, the primary object of the present invention is to provide an improved intake manifold structure for a V-type engine which can be easily manufactured at a low cost.

In accordance with the present invention, the intake manifold structure for forming discrete intake passages which are separately communicated with the respective intake ports to introduce intake air into the cylinders corresponding thereto comprises first and second pieces. The first piece is provided with a plurality of passages each forming one of said discrete intake passages communicated with the intake ports of the first cylinder bank and a connecting portion for integrally connecting the passages at a portion near the first cylinder bank. The second piece is provided with a plurality of passages each forming one of said discrete intake passages communicated with the intake ports of the second cylinder bank and a connecting portion for integrally connecting the passages at a portion near the second cylinder bank. The first and second pieces are fastened together so that the passages of the first and second pieces are alternately positioned in the direction of the row of the cylinders and cross each other between the first and second cylinder banks.

By casting the intake manifold in two pieces, the parting line is simplified so that almost no undercut portion is required in the molds for casting each piece.

BRIEF DESCRIPTION OF THE DRAWINGS

FIG. 5 is a perspective view showing the first and second intake manifold pieces before they are united into the intake manifold assembly shown in FIG. 2.

DESCRIPTION OF THE PREFERRED EMBODIMENT

Figure 1:
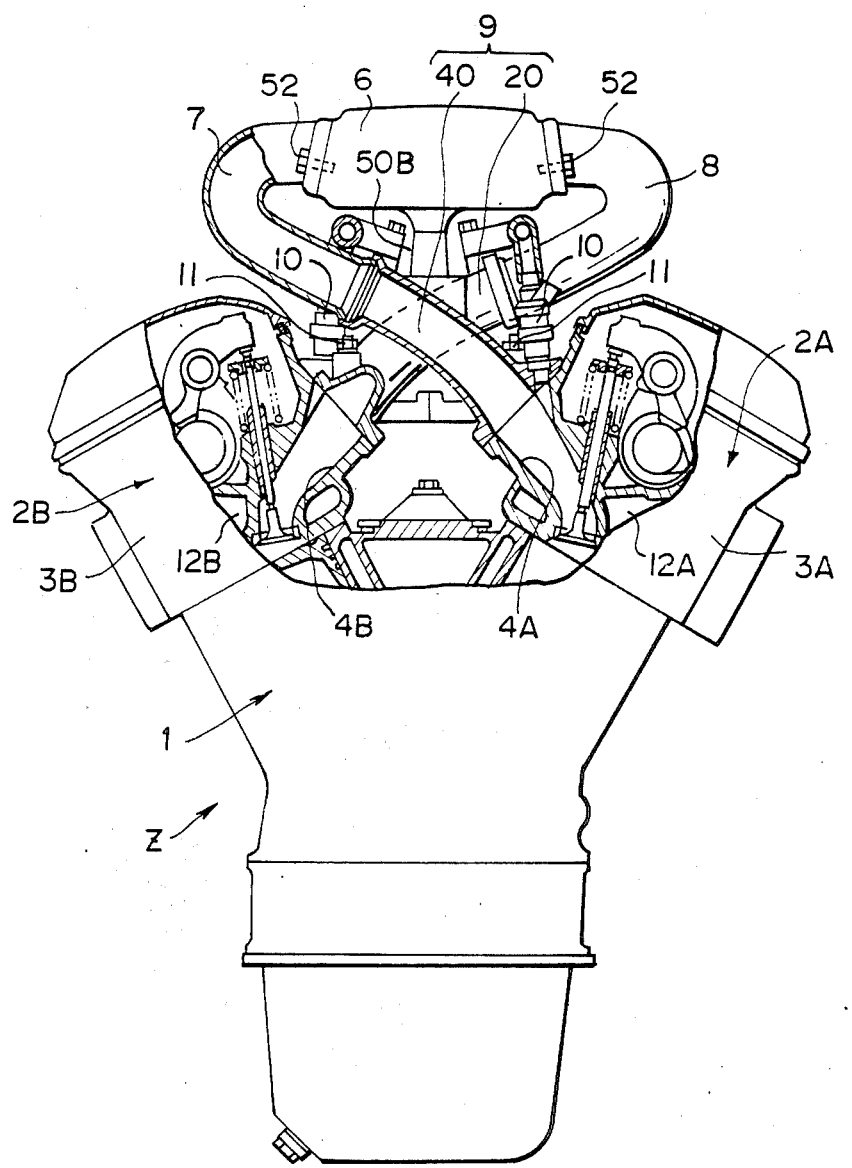
FIG. 1 is a front view partly in cross-section of a V-type engine provided with an intake manifold structure in accordance with an embodiment of the present invention.

In FIG. 1, a V-6 engine Z has a first cylinder bank 2A and a second cylinder bank 2B set at an angle. Reference numerals 1, 3A and 3B respectively denote a cylinder block, right and left cylinder heads, and reference numerals 4A and 4B respectively denote intake ports of the cylinders in the first and second cylinder banks 2A and 2B.

To the first cylinder bank 2A is connected a first intake manifold piece 20 (FIG. 5) having three discrete pipes 21A, 21B and 21C formed integrally with each other, each of the discrete pipes 21A to 21C being discretely communicated with the intake port 4A of one of the three cylinders in the first cylinder bank 2A. Similarly, to the second cylinder bank 2B is connected a second intake manifold piece 40 (FIG. 5) having three discrete pipes 41A, 41B and 41C formed integrally with each other, each of the discrete pipes 41A to 41C being discretely communicated with the intake port 4B of one of the three cylinders in the second cylinder bank 2B. The first and second intake manifold pieces 20 and 40 are arranged to cross each other in an X-shaped form. The first and second intake manifold pieces 20 and 40 are integrally fastened together to form a manifold assembly 9 as will be described in detail later. The manifold assembly 9 is fixed to the cylinder heads 3A and 3B by mounting bolts 11 on the first and second cylinder banks 2A and 2B. The manifold assembly 9 is provided with a pair of surge tank mounting bosses 50A and 50B projecting upward from the top of the manifold assembly 9, and a surge tank 6 is fixedly mounted on the mounting bosses 50A and 50B by bolts.

The first intake manifold piece 20 is communicated with the surge tank 6 by way of U-shaped pipe members 8 connected between the outer ends of the discrete pipes 21A to 21C and the surge tank 6. Similarly, the second intake manifold piece 40 is communicated with the surge tank 6 by way of U-shaped pipe members 7 connected between the outer ends of the discrete pipes 41A to 41C and the surge tank 6. Each of the U-shaped pipe members 7 and 8 is telescoped in the corresponding discrete pipes at the lower end and fixed to the 15 side wall of the surge tank 6 by bolts 52 at the upper end. Thus, six discrete intake passages respectively connecting the six cylinders to the surge tank 6 are formed by the discrete pipes 21A to 21C and 41A to 41C and the U-shaped pipe members 7 and 8. Reference numeral 10 in FIG. 1 denotes a fuel injector.

Figure 2:
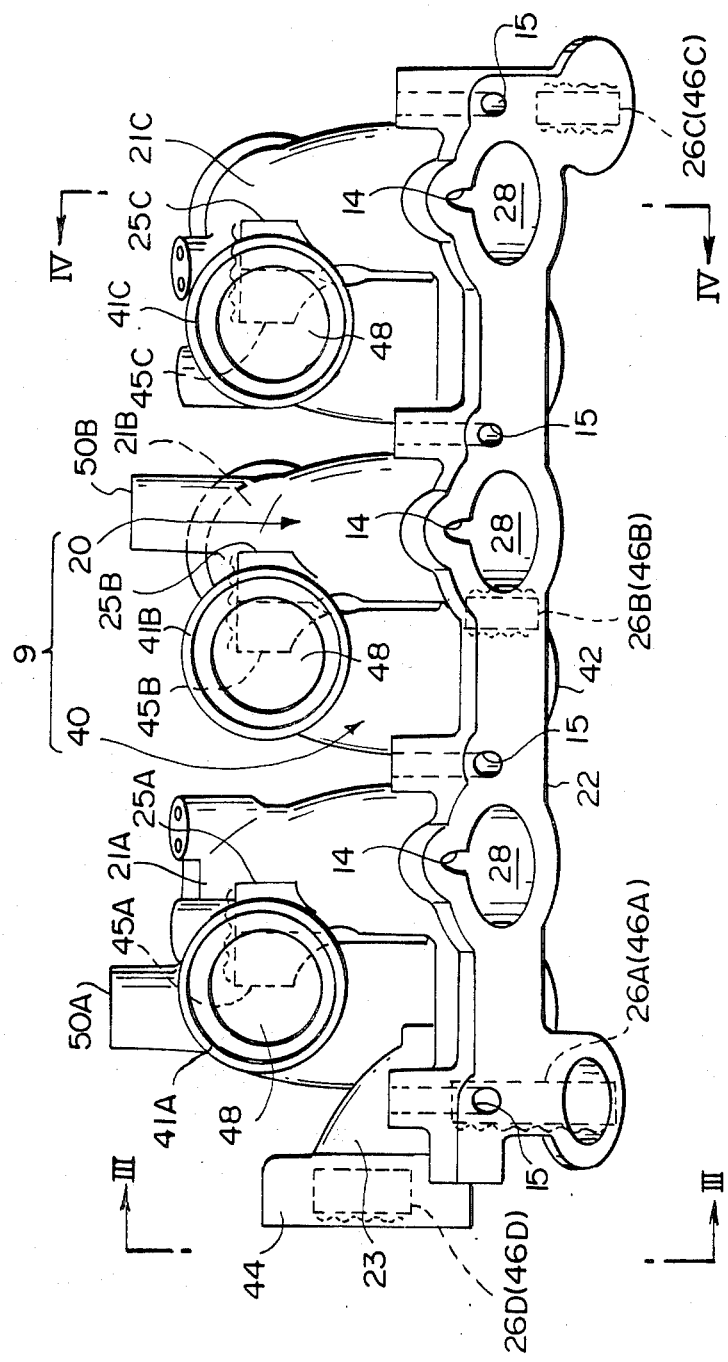
FIG. 2 is an enlarged side view showing the intake manifold structure employed in the engine shown in FIG. 1.

Referring to FIGS. 2 and 5, the first intake manifold piece 20 is integrally provided with the three discrete pipes 21A to 21C which are arranged at the same spacing as the intake ports 4A of the first cylinder bank 2A and the interiors 28 of which form a part of the discrete intake passages, a coolant pipe 23 adapted to be connected to a water jacket 12A (FIG. 1) on the side of the first cylinder bank 2A, a flange 22 integrally connecting together the discrete pipes 21A to 21C and the coolant pipe 23, and said surge tank mounting boss 50B projecting upward from the discrete pipe 21B, and is formed in one piece by casting.

Similarly, the second intake manifold piece 40 is integrally provided with the three discrete pipes 41A to 41C which are arranged at the same spacing as the intake ports 4B of the second cylinder bank 2B and the interiors 48 of which form a part of the discrete intake passages, a coolant pipe 43 adapted to be connected to a water jacket 12B (FIG. 1) on the side of the second cylinder bank 2B, a flange 42 integrally connecting together the discrete pipes 41A to 41C and the coolant pipe 43, and said surge tank mounting boss 50A projecting upward from the discrete pipe 41A, and is formed in one piece by casting. The flanges 22 and 42 are respectively provided on the lower ends of the respective first and second intake manifold pieces 20 and 40 to respectively connect together the lower ends of the discrete pipes 21A to 21C and 41A to 41C of the respective manifold pieces 20 and 40. At the same time, the flanges 22 and 42 form a mounting surface of the manifold assembly 9 to the cylinder heads 3A and 3B. Further, the upper end of each discrete pipe is provided with an enlarged portion adapted to receive said U-shaped pipe member.

Figure 3:
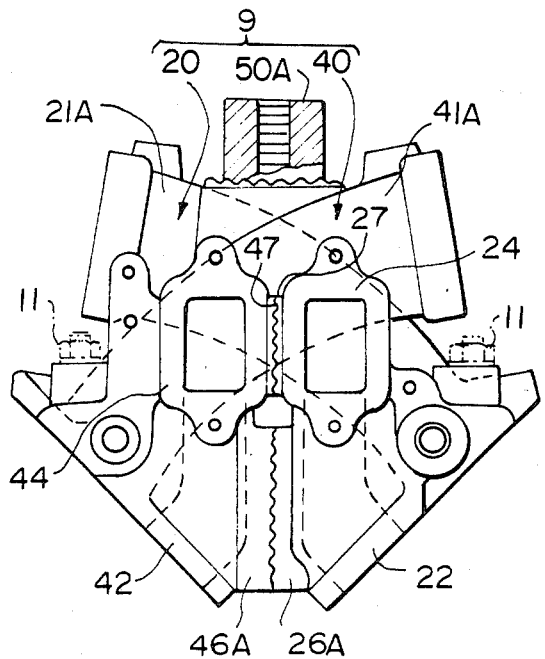
FIG. 3 is a view as viewed in the direction of arrows III—III in FIG. 2.
Figure 4:
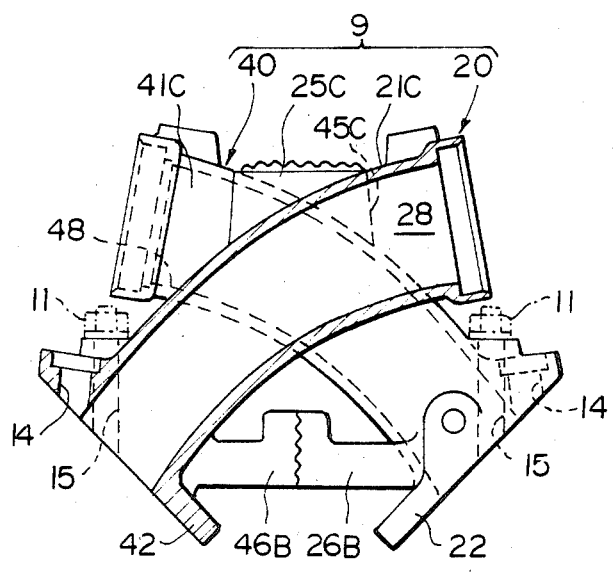
FIG. 4 is a cross-sectional view taken along line IV—IV in FIG. 2.

As shown in FIGS. 2 to 4, the first and second intake manifold pieces 20 and 40 are positioned relative to each other so that the discrete pipes 21A to 21C of the first intake manifold piece 20 and the discrete pipes 41A to 41C of the second intake manifold piece 40 are positioned alternately, and fastened together to form the intake manifold assembly 9. Each of the intake manifold pieces 20 and 40 is provided with seven fastening pieces which are adapted to abut against the corresponding bonding pieces of the other intake manifold piece, and the first and second intake manifold pieces 20 and 40 are integrally fastened together by welding of the opposed surfaces of the bonding pieces of the first and second intake manifold pieces 20 and 40. The seven welded portions are shown by corrugated lines. That is, the discrete pipes 21A to 21C of the first intake manifold piece 20 are provided, on the outer surface at an intermediate portion thereof, with upper fastening pieces 25A to 25C which are adapted to abut against fastening pieces 45A to 45C provided on the discrete pipes 41A to 41C of the second intake manifold piece 40 on the outer surface at an intermediate portion thereof, the fastening pieces 25A to 25C being aligned respectively with the fastening pieces 45A to 45C in the direction in which the discrete pipes 21A to 21C and 41A to 41C are arranged. The fastening pieces 25A to 25C are respectively welded to the fastening pieces 45A to 45C, and thus the upper portions of the first and second manifold pieces 20 and 40 are welded together in three places.

Further, the discrete pipes 21A to 21C of the first intake manifold piece 20 are provided, on a lower portion of the flange 22, with lower fastening pieces 26A to 26C which are adapted to abut against lower fastening pieces 46A to 46C provided on a lower portions of the flange 42 of the second intake manifold piece 40, the fastening pieces 26A to 26C being provided to project in the transverse direction at equal spaces in the direction in which the discrete pipes are arranged and aligned respectively with the fastening pieces 46A to 46C in the direction in which the discrete pipes 21A to 21C and 41A to 41C are arranged. The fastening pieces 26A to 26C are respectively welded to the fastening pieces 46A to 46C, and thus the lower portions of the first and second manifold pieces 20 and 40 are welded together in three places.

Further, the coolant pipe 23 of the first manifold piece 20 and the coolant pipe 43 of the second manifold piece 40 are respectively provided with flanges 24 and 44, and intermediate fastening pieces 27 and 47 are respectively formed on the side surfaces of the flanges 24 and 44. The fastening pieces 27 and 47 are brought into abutment with each other and are welded together. Thus, the manifold pieces 20 and 40 are welded together at an intermediate portion in addition to the upper and lower portions.

In FIGS. 2 and 4, reference numerals 14 and 15 respectively denote holes for mounting the fuel injector and holes for inserting the mounting bolts 11.

The method of manufacturing the manifold assembly 9 described above in which the first and second intake manifold pieces 20 and 40 are separately formed by casting and then are fastened together to form the manifold assembly 9 is advantageous over the method in which the manifold assembly is integrally formed in one piece in that the cast molding operation is facilitated since the parting line of the casting molds is simplified and the undercut portion can be substantially eliminated, thereby enabling the article to be molded by molds having no core.

To form the manifold assembly by fastening together the first and second intake manifold pieces 20 and 40 is facilitated by fitting together the upper ends of the discrete pipes 21A to 21C and 41A to 41C and the U-shaped pipe members 7 and 8. That is, when the upper ends of the discrete pipes are connected to the U-shaped pipe members by butting flanges formed on their opposed ends and fixing together the flanges by bolts, the ends of the discrete pipes are enlarged, making difficult the assembly of the first and second intake manifold pieces 20 and 40 into the manifold assembly 9.

In the incorporation of the intake system in the engine Z, the manifold assembly 9 is first fixed to the cylinder heads 3A and 3B by the mounting bolts 11, the surge tank 6 is then fixed to the surge tank mounting bosses 50A and 50B by bolts (not shown), and finally, the lower ends of the U-shaped pipe members 7 and 8 are fitted into the upper ends of the corresponding discrete pipes and are fixed to the surge tank 6 at their upper ends by the bolts 52.

Though, in the embodiment described above, the first and second manifold pieces 20 and 40 are fastened together by welding, they may be fixed together by bolts, for instance.

We claim:

1. In an intake system for a V-type engine having a plurality of cylinders in each of first and second cylinder banks, a plurality of intake ports each of which is communicated with one of the cylinders being open in the inner surfaces of the cylinder banks opposed to each other, an intake manifold structure for forming discrete intake passages which are separately communicated with the respective intake ports to introduce intake air into the cylinders corresponding thereto, comprising a first piece which is provided with a plurality of discrete passages each forming one of said discrete intake passages communicated with the intake ports of the first cylinder bank and a connecting portion for integrally connecting the discrete passages at a portion near the first cylinder bank; a second piece which is provided with a plurality of discrete passages each forming one of said discrete intake passages communicated with the intake ports of the second cylinder bank and a connecting portion for integrally connecting the discrete passages at a portion near the second cylinder bank; and a fastening means for fastening together the first and second pieces so that the passages of the first and second pieces are alternately positioned in the direction of the row of the cylinders and cross each other between the first and second cylinder banks.

2. An intake manifold structure as defined in claim 1 in which said connecting portion of each piece comprises a plate-like flange connecting the downstream end of the discrete passages, one face of the flange forming a mounting surface for mounting the piece on the corresponding cylinder bank.

3. An intake manifold structure as defined in claim 1 in which each of the first and second pieces is provided with a plurality of fastening portions projecting from a portion near the downstream end of the piece toward the other piece and said fastening means fastens together the corresponding fastening portions of the first and second pieces.

4. An intake manifold structure as defined in claim 3 in which the corresponding fastening portions of the first and second pieces are brought into abutment with each other and welded together.

5. An intake manifold structure as defined in claim 1 in which each of said discrete passages is connected to the upstream part of the intake system by way of a connecting passage portion, the discrete passage being connected to the connecting passage portion by fitting one of the opposed ends of the discrete passage and the connecting passage portion into the other.

6. An intake manifold structure as defined in claim 5 in which the end of the discrete passage opposed to the connecting passage portion is enlarged and the end of the connecting passage portion is fitted into the opposed end of the discrete passage.

7. An intake manifold structure as defined in claim 5 in which said upstream part of the intake system has a surge tank with which all the discrete passages are communicated, the surge tank being mounted on a surge tank mounting boss provided on at least one of the first and second pieces.

8. An intake manifold structure as defined in claim 7 in which said connecting passage portions connect the respective discrete passages with the surge tank.

9. An intake manifold structure as defined in claim 8 in which the end of each of the the discrete passages opposed to the corresponding connecting passage portion is enlarged and the end of the connecting passage portion is fitted into the opposed end of the discrete passage, the connecting portions being fixed to the opposite side faces of the surge tank.

* * * * *